United States Patent
Wagner et al.

(10) Patent No.: US 9,693,428 B2
(45) Date of Patent: Jun. 27, 2017

(54) LIGHTING CONTROL WITH AUTOMATED ACTIVATION PROCESS

(71) Applicant: ABL IP Holding LLC, Conyers, GA (US)

(72) Inventors: Phillip Ryan Wagner, Baltimore, OH (US); Douglas Aldrich Stewart, Canton, GA (US); Michael Jay Dorogi, Newark, OH (US); Robert Burt, Columbus, OH (US); Christopher Scott Shelton, Kennesaw, GA (US)

(73) Assignee: ABL IP Holding LLC, Decatur, GA (US)

( * ) Notice: Subject to any disclaimer, the term of this patent is extended or adjusted under 35 U.S.C. 154(b) by 60 days.

(21) Appl. No.: 14/883,786

(22) Filed: Oct. 15, 2015

(65) Prior Publication Data

US 2016/0113094 A1    Apr. 21, 2016

Related U.S. Application Data

(60) Provisional application No. 62/064,233, filed on Oct. 15, 2014.

(51) Int. Cl.
    *H05B 33/08* (2006.01)
    *H05B 37/02* (2006.01)
(52) U.S. Cl.
    CPC .......... *H05B 37/0245* (2013.01); *Y02B 20/72* (2013.01)
(58) Field of Classification Search
    None
    See application file for complete search history.

(56) References Cited

U.S. PATENT DOCUMENTS 2,924,806 A    2/1960 Hubbell et al.
3,066,276 A    11/1962 Hubbell et al.
(Continued)

FOREIGN PATENT DOCUMENTS

CN    102958227    3/2013
DE    102004030883    1/2006
(Continued)

OTHER PUBLICATIONS

Notice of Allowance for Canadian Patent Application No. CA 2,908,835, mailed Aug. 3, 2016, 1 page.
(Continued)

*Primary Examiner* — Dedei K Hammond
(74) *Attorney, Agent, or Firm* — Kilpatrick Townsend & Stockton, LLP

(57) ABSTRACT

Lighting fixture control systems and method are described including a control station configured to communicate with a plurality of remotely located fixture control devices that are associated with lighting fixtures. Individual fixture control devices may be configured to perform automatic activation operations, that include the fixture control device determining one or more of an identifier of the node, a GPS coordinate of the node, an operating Voltage of the node, a lamp Wattage of the lighting device, a lamp type of the lighting fixture, and a dimming capability of the lighting fixture. The fixture control device may be configured to send results of the automatic activation operation to the control station. The control station may be configured to store a file associated with the node, including the received results of the automatic activation operation.

20 Claims, 7 Drawing Sheets

(56) References Cited

U.S. PATENT DOCUMENTS

| | | |
|---|---|---|
| 3,083,347 A | 3/1963 | Fahey, Jr. |
| 3,112,973 A | 12/1963 | Von Holtz |
| 3,149,317 A | 9/1964 | Brugliera et al. |
| 3,206,709 A | 9/1965 | De Vore, Jr. |
| 3,233,204 A | 2/1966 | De Vore, Jr. |
| 3,292,135 A | 12/1966 | Robinson |
| 3,339,171 A | 8/1967 | Carlson |
| 3,350,675 A | 10/1967 | Misencik et al. |
| 3,393,395 A | 7/1968 | Hubbell |
| 3,500,291 A | 3/1970 | Hubbell et al. |
| 3,747,104 A | 7/1973 | Pansini |
| 3,945,702 A | 3/1976 | Poliak et al. |
| 3,949,211 A | 4/1976 | Elms |
| 4,241,969 A | 12/1980 | D'Amato et al. |
| 4,477,143 A | 10/1984 | Taylor |
| 4,482,844 A | 11/1984 | Schweer et al. |
| 4,653,834 A | 3/1987 | Norden |
| 4,691,341 A | 9/1987 | Knoble et al. |
| 4,695,769 A | 9/1987 | Schweickardt |
| 4,726,780 A | 2/1988 | Thackeray |
| 5,046,961 A | 9/1991 | Hoffman |
| 5,235,320 A | 8/1993 | Romano |
| 5,450,302 A | 9/1995 | Maase et al. |
| 5,452,294 A | 9/1995 | Natarajan |
| 5,479,159 A | 12/1995 | Kelly et al. |
| 5,537,008 A | 7/1996 | Matsuda et al. |
| 5,546,397 A | 8/1996 | Mahany |
| 5,593,318 A | 1/1997 | Bilson et al. |
| 5,641,310 A | 6/1997 | Tiberio, Jr. |
| 5,647,751 A | 7/1997 | Shulman et al. |
| 5,652,751 A | 7/1997 | Sharony |
| 5,654,968 A | 8/1997 | Smiroldo |
| 5,661,468 A | 8/1997 | Marcoux |
| 5,680,926 A | 10/1997 | Sandor et al. |
| 5,740,366 A | 4/1998 | Mahany et al. |
| 5,741,149 A | 4/1998 | Anthony |
| 5,805,593 A | 9/1998 | Busche |
| 5,823,833 A | 10/1998 | Castaldo |
| 5,844,893 A | 12/1998 | Gollnick et al. |
| 5,884,181 A | 3/1999 | Arnold et al. |
| 5,940,771 A | 8/1999 | Gollnick et al. |
| 5,962,991 A | 10/1999 | Levy |
| 5,963,546 A | 10/1999 | Shoji |
| 5,986,574 A | 11/1999 | Colton |
| 6,028,396 A | 2/2000 | Morrissey, Jr. et al. |
| 6,028,853 A | 2/2000 | Haartsen |
| 6,035,266 A | 3/2000 | Williams et al. |
| 6,044,062 A | 3/2000 | Brownrigg et al. |
| 6,046,992 A | 4/2000 | Meier et al. |
| 6,119,076 A | 9/2000 | Williams et al. |
| 6,130,881 A | 10/2000 | Stiller et al. |
| 6,166,698 A | 12/2000 | Turnbull et al. |
| 6,174,073 B1 | 1/2001 | Regan et al. |
| 6,181,086 B1 | 1/2001 | Katyl et al. |
| 6,181,294 B1 | 1/2001 | Porter et al. |
| 6,192,053 B1 | 2/2001 | Angelico et al. |
| 6,239,722 B1 | 5/2001 | Colton et al. |
| 6,249,516 B1 | 6/2001 | Brownrigg et al. |
| 6,275,707 B1 | 8/2001 | Reed et al. |
| 6,297,781 B1 | 10/2001 | Turnbull et al. |
| 6,301,257 B1 | 10/2001 | Johnson et al. |
| 6,304,556 B1 | 10/2001 | Haas |
| 6,328,581 B1 | 12/2001 | Lee et al. |
| 6,349,091 B1 | 2/2002 | Li |
| 6,370,489 B1 | 4/2002 | Williams et al. |
| 6,374,311 B1 | 4/2002 | Mahany et al. |
| 6,388,396 B1 | 5/2002 | Katyl et al. |
| 6,392,368 B1 | 5/2002 | Deller et al. |
| 6,393,381 B1 | 5/2002 | Williams et al. |
| 6,396,216 B1 | 5/2002 | Noone et al. |
| 6,407,712 B1 | 6/2002 | Turnbull et al. |
| 6,415,245 B2 | 7/2002 | Williams et al. |
| 6,437,692 B1 | 8/2002 | Petite et al. |
| 6,452,339 B1 | 9/2002 | Morrissey et al. |
| 6,456,960 B1 | 9/2002 | Williams et al. |
| 6,462,713 B2 | 10/2002 | Porter et al. |
| 6,465,963 B1 | 10/2002 | Turnbull et al. |
| 6,509,841 B1 | 1/2003 | Colton et al. |
| 6,535,498 B1 | 3/2003 | Larsson et al. |
| 6,553,020 B1 | 4/2003 | Hughes et al. |
| 6,574,227 B1 | 6/2003 | Rosenberg et al. |
| 6,592,245 B1 | 7/2003 | Tribelsky et al. |
| 6,604,062 B2 | 8/2003 | Williams et al. |
| 6,636,005 B2 | 10/2003 | Wacyk et al. |
| 6,640,087 B2 | 10/2003 | Reed et al. |
| 6,650,249 B2 | 11/2003 | Meyer et al. |
| 6,653,945 B2 | 11/2003 | Johnson et al. |
| 6,665,536 B1 | 12/2003 | Mahany |
| 6,676,279 B1 | 1/2004 | Hubbell et al. |
| 6,704,283 B1 | 3/2004 | Stiller et al. |
| 6,705,744 B2 | 3/2004 | Hubbell et al. |
| 6,714,559 B1 | 3/2004 | Meier |
| 6,714,895 B2 | 3/2004 | Williams et al. |
| 6,731,079 B2 | 5/2004 | Andersen |
| 6,734,642 B1 | 5/2004 | Reverberi |
| 6,744,740 B2 | 6/2004 | Chen |
| 6,744,766 B2 | 6/2004 | Alapuranen |
| 6,750,823 B2 | 6/2004 | Turnbull et al. |
| 6,751,455 B1 | 6/2004 | Acampora |
| 6,754,192 B2 | 6/2004 | Kennedy |
| 6,757,268 B1 | 6/2004 | Zendle |
| 6,771,666 B2 | 8/2004 | Barker, Jr. |
| 6,807,165 B2 | 10/2004 | Belcea |
| 6,807,516 B2 | 10/2004 | Williams et al. |
| 6,836,737 B2 | 12/2004 | Petite et al. |
| 6,841,944 B2 | 1/2005 | Morrissey et al. |
| 6,850,502 B1 | 2/2005 | Kagan et al. |
| 6,870,846 B2 | 3/2005 | Cain |
| 6,879,574 B2 | 4/2005 | Naghian et al. |
| 6,883,930 B2 | 4/2005 | Saban et al. |
| 6,889,174 B2 | 5/2005 | Williams et al. |
| 6,892,168 B2 | 5/2005 | Williams et al. |
| 6,903,699 B2 | 6/2005 | Porter et al. |
| 6,917,985 B2 | 7/2005 | Madruga et al. |
| 6,944,131 B2 | 9/2005 | Beshai et al. |
| 6,965,568 B1 | 11/2005 | Larsen |
| 6,965,575 B2 | 11/2005 | Srikrishna et al. |
| 6,970,444 B2 | 11/2005 | Chwieseni et al. |
| 6,977,937 B1 | 12/2005 | Weinstein et al. |
| 6,980,537 B1 | 12/2005 | Liu |
| 6,982,982 B1 | 1/2006 | Barker, Jr. et al. |
| 6,990,394 B2 | 1/2006 | Pasternak |
| 6,991,346 B2 | 1/2006 | Saban et al. |
| 7,011,552 B2 | 3/2006 | Hoxha |
| 7,013,138 B2 | 3/2006 | Mahany |
| 7,050,808 B2 | 5/2006 | Janusz et al. |
| 7,103,511 B2 | 9/2006 | Petite |
| 7,113,893 B2 | 9/2006 | Williams et al. |
| 7,120,560 B2 | 10/2006 | Williams et al. |
| 7,123,140 B1 | 10/2006 | Denes |
| 7,126,494 B2 | 10/2006 | Ardalan et al. |
| 7,144,260 B2 | 12/2006 | Murayama et al. |
| 7,167,777 B2 | 1/2007 | Budike, Jr. |
| 7,209,840 B2 | 4/2007 | Petite et al. |
| 7,254,372 B2 | 8/2007 | Janusz et al. |
| 7,307,514 B2 | 12/2007 | McAden |
| 7,309,965 B2 | 12/2007 | Dowling et al. |
| 7,312,721 B2 | 12/2007 | Mason, Jr. et al. |
| 7,333,903 B2 | 2/2008 | Walters et al. |
| 7,358,679 B2 | 4/2008 | Lys et al. |
| 7,369,056 B2 | 5/2008 | McCollough, Jr. |
| 7,386,002 B2 | 6/2008 | Meier et al. |
| 7,429,828 B2 | 9/2008 | Cleland et al. |
| 7,446,671 B2 | 11/2008 | Giannopoulos et al. |
| 7,457,645 B2 | 11/2008 | Choi et al. |
| 7,468,561 B2 | 12/2008 | Kern et al. |
| 7,468,661 B2 | 12/2008 | Petite et al. |
| 7,489,120 B2 | 2/2009 | Matthews |
| 7,493,100 B2 | 2/2009 | Welles, II et al. |
| 7,529,594 B2 | 5/2009 | Walters et al. |
| 7,535,921 B2 | 5/2009 | Meier |
| 7,546,167 B2 | 6/2009 | Walters et al. |
| 7,546,168 B2 | 6/2009 | Walters et al. |
| 7,548,553 B2 | 6/2009 | Meier |

(56) References Cited

U.S. PATENT DOCUMENTS

| | | |
|---|---|---|
| 7,549,773 B2 | 6/2009 | Lim |
| 7,561,062 B2 | 7/2009 | Schleich et al. |
| 7,565,006 B2 | 7/2009 | Stam et al. |
| 7,602,937 B2 | 10/2009 | Mian et al. |
| 7,603,184 B2 | 10/2009 | Walters et al. |
| 7,637,766 B2 | 12/2009 | Kauffman et al. |
| 7,697,492 B2 | 4/2010 | Petite |
| 7,710,907 B2 | 5/2010 | Mahany |
| 7,731,383 B2 | 6/2010 | Myer |
| 7,734,356 B2 | 6/2010 | Cleland et al. |
| 7,761,260 B2 | 7/2010 | Walters et al. |
| 7,778,635 B2 | 8/2010 | Crookham et al. |
| 7,791,492 B2 | 9/2010 | Nam et al. |
| 7,796,030 B2 | 9/2010 | Lim |
| 7,817,063 B2 | 10/2010 | Hawkins et al. |
| 7,825,602 B2 | 11/2010 | Hu et al. |
| 7,825,793 B1 | 11/2010 | Spillman et al. |
| 7,828,463 B1 | 11/2010 | Willis |
| 7,834,555 B2 | 11/2010 | Cleland et al. |
| 7,855,540 B2 | 12/2010 | Matthews |
| 7,860,672 B2 | 12/2010 | Richeson et al. |
| 7,866,850 B2 | 1/2011 | Alexander et al. |
| 7,873,343 B2 | 1/2011 | Gollnick et al. |
| 7,899,207 B2 | 3/2011 | Mian et al. |
| 7,911,359 B2 | 3/2011 | Walters et al. |
| 7,916,747 B2 | 3/2011 | Meier |
| 7,972,054 B2 | 7/2011 | Alexander et al. |
| 7,985,005 B2 | 7/2011 | Alexander et al. |
| 8,013,718 B2 | 9/2011 | McCollough, Jr. |
| 8,029,154 B2 | 10/2011 | Myer |
| 8,038,481 B1 | 10/2011 | Creighton et al. |
| 8,072,164 B2 | 12/2011 | Ilyes et al. |
| 8,100,552 B2 | 1/2012 | Spero |
| 8,136,969 B2 | 3/2012 | Burkett |
| 8,138,630 B2 | 3/2012 | Dibachi et al. |
| 8,140,279 B2 | 3/2012 | Subbloie |
| 8,152,336 B2 | 4/2012 | Alexander et al. |
| 8,177,395 B2 | 5/2012 | Alexander et al. |
| 8,188,878 B2 | 5/2012 | Pederson et al. |
| 8,188,879 B2 | 5/2012 | Pederson |
| 8,243,004 B2 | 8/2012 | Fergason |
| 8,264,156 B2 | 9/2012 | Cleland et al. |
| 8,290,710 B2 | 10/2012 | Cleland |
| 8,396,608 B2 | 3/2013 | Subbloie et al. |
| 8,398,435 B2 | 3/2013 | Aurongzeb et al. |
| 8,414,178 B2 | 4/2013 | Alexander et al. |
| 8,433,426 B2 | 4/2013 | Cleland et al. |
| 8,434,909 B2 | 5/2013 | Nichol et al. |
| 8,445,826 B2 | 5/2013 | Verfuerth |
| 8,456,325 B1 | 6/2013 | Sikora |
| 8,463,454 B2 | 6/2013 | Ilyes |
| 8,471,698 B2 | 6/2013 | Petrisor et al. |
| 8,475,002 B2 | 7/2013 | Maxik et al. |
| 8,476,565 B2 | 7/2013 | Verfuerth |
| 8,502,456 B2 | 8/2013 | Jarrell et al. |
| 8,538,596 B2 | 9/2013 | Gu et al. |
| 8,541,949 B2 | 9/2013 | Donners |
| 8,562,180 B2 | 10/2013 | Alexander et al. |
| 8,570,190 B2 | 10/2013 | Marinakis et al. |
| 8,586,902 B2 | 11/2013 | Verfuerth |
| 8,587,222 B2 | 11/2013 | Amutham |
| 8,587,223 B2 | 11/2013 | Ilyes et al. |
| 8,588,830 B2 | 11/2013 | Myer et al. |
| 8,588,942 B2 | 11/2013 | Agrawal |
| 8,593,299 B2 | 11/2013 | Pederson |
| 8,602,584 B2 | 12/2013 | Ghafoori et al. |
| 8,604,712 B2 | 12/2013 | Bloom et al. |
| 8,641,241 B2 | 2/2014 | Farmer |
| 8,674,629 B2 | 3/2014 | Agrawal |
| 8,686,664 B2 | 4/2014 | Herbst et al. |
| 8,686,665 B2 | 4/2014 | Horbst et al. |
| 8,694,256 B2 | 4/2014 | Cleland et al. |
| 8,706,310 B2 | 4/2014 | Barrilleaux |
| 8,716,942 B2 | 5/2014 | Jarrell et al. |
| 8,725,330 B2 | 5/2014 | Failing |
| 8,729,446 B2 | 5/2014 | Verfuerth |
| 8,731,866 B2 | 5/2014 | Cacace et al. |
| 8,732,031 B2 | 5/2014 | Martin et al. |
| 9,049,753 B1 * | 6/2015 | Wassel ............... H05B 37/02 |
| 2001/0005368 A1 | 6/2001 | Rune |
| 2001/0034793 A1 | 10/2001 | Madruga et al. |
| 2002/0002444 A1 | 1/2002 | Williams et al. |
| 2002/0009975 A1 | 1/2002 | Janusz et al. |
| 2002/0013679 A1 | 1/2002 | Petite |
| 2002/0013856 A1 | 1/2002 | Garcia-Luna-Aceves et al. |
| 2002/0044549 A1 | 4/2002 | Johansson et al. |
| 2002/0158805 A1 | 10/2002 | Turnbull et al. |
| 2002/0159274 A1 | 10/2002 | Hubbell et al. |
| 2002/0161556 A1 | 10/2002 | Williams et al. |
| 2002/0163805 A1 | 11/2002 | Hubbell et al. |
| 2002/0176396 A1 | 11/2002 | Hammel et al. |
| 2002/0181427 A1 | 12/2002 | Sparr et al. |
| 2004/0001442 A1 | 1/2004 | Rayment et al. |
| 2004/0062224 A1 | 4/2004 | Brownrigg et al. |
| 2004/0105264 A1 | 6/2004 | Spero |
| 2004/0143380 A1 | 7/2004 | Stam et al. |
| 2004/0151129 A1 | 8/2004 | Kun-Szabo et al. |
| 2004/0218382 A1 | 11/2004 | Saban et al. |
| 2004/0248578 A1 | 12/2004 | Korpela et al. |
| 2004/0252643 A1 | 12/2004 | Joshi |
| 2005/0029955 A1 | 2/2005 | Blake |
| 2005/0035720 A1 | 2/2005 | Blake |
| 2005/0054292 A1 | 3/2005 | Janusz et al. |
| 2005/0151666 A1 | 7/2005 | Saban et al. |
| 2005/0187701 A1 | 8/2005 | Baney et al. |
| 2005/0253533 A1 | 11/2005 | Lys et al. |
| 2005/0270537 A1 | 12/2005 | Mian et al. |
| 2006/0002368 A1 | 1/2006 | Budampati et al. |
| 2007/0014119 A1 | 1/2007 | Burkett |
| 2007/0021946 A1 | 1/2007 | Williams et al. |
| 2007/0032990 A1 | 2/2007 | Williams et al. |
| 2007/0040513 A1 | 2/2007 | Cleland et al. |
| 2007/0043540 A1 | 2/2007 | Cleland et al. |
| 2007/0043541 A1 | 2/2007 | Cleland et al. |
| 2007/0153526 A1 | 7/2007 | Lim |
| 2007/0273509 A1 | 11/2007 | Gananathan |
| 2007/0273539 A1 | 11/2007 | Gananathan |
| 2008/0177994 A1 | 7/2008 | Mayer |
| 2008/0211427 A1 | 9/2008 | Budde et al. |
| 2008/0211430 A1 | 9/2008 | Wilhelm |
| 2008/0219210 A1 | 9/2008 | Shuey et al. |
| 2008/0292320 A1 | 11/2008 | Pederson |
| 2008/0309504 A1 | 12/2008 | Lim |
| 2008/0310850 A1 | 12/2008 | Pederson et al. |
| 2009/0001893 A1 | 1/2009 | Cleland et al. |
| 2009/0009089 A1 | 1/2009 | Burkett |
| 2009/0040750 A1 | 2/2009 | Myer |
| 2009/0050785 A1 | 2/2009 | Flaherty |
| 2009/0066258 A1 | 3/2009 | Cleland et al. |
| 2009/0066540 A1 | 3/2009 | Marinakis et al. |
| 2009/0083167 A1 | 3/2009 | Subbloie |
| 2009/0088021 A1 | 4/2009 | Kauffman et al. |
| 2009/0096623 A1 | 4/2009 | Roosli et al. |
| 2009/0224940 A1 | 9/2009 | Cornwall |
| 2009/0262189 A1 | 10/2009 | Marman |
| 2009/0267540 A1 | 10/2009 | Chemel et al. |
| 2009/0278472 A1 | 11/2009 | Mills et al. |
| 2009/0278479 A1 | 11/2009 | Platner et al. |
| 2009/0315466 A1 | 12/2009 | Ko et al. |
| 2010/0007521 A1 | 1/2010 | Cornwall |
| 2010/0013608 A1 | 1/2010 | Petrisor et al. |
| 2010/0027838 A1 | 2/2010 | Mian et al. |
| 2010/0029268 A1 | 2/2010 | Myer et al. |
| 2010/0039240 A1 | 2/2010 | Rodriguez et al. |
| 2010/0127642 A1 | 5/2010 | Chen et al. |
| 2010/0204960 A1 | 8/2010 | Hagadone |
| 2010/0252715 A1 | 10/2010 | Flaherty |
| 2010/0264853 A1 | 10/2010 | Amutham |
| 2010/0286841 A1 | 11/2010 | Subbloie |
| 2010/0287081 A1 | 11/2010 | Walters et al. |
| 2010/0308736 A1 | 12/2010 | Hung et al. |
| 2011/0038288 A1 | 2/2011 | Osterloh et al. |
| 2011/0049749 A1 | 3/2011 | Bailey et al. |
| 2011/0050100 A1 | 3/2011 | Bailey et al. |

(56) References Cited

U.S. PATENT DOCUMENTS

| | | |
|---|---|---|
| 2011/0050101 A1 | 3/2011 | Bailey et al. |
| 2011/0050124 A1 | 3/2011 | Bailey et al. |
| 2011/0051414 A1 | 3/2011 | Bailey et al. |
| 2011/0057570 A1 | 3/2011 | Cleland et al. |
| 2011/0063849 A1 | 3/2011 | Alexander et al. |
| 2011/0068624 A1 | 3/2011 | Dibachi et al. |
| 2011/0074598 A1 | 3/2011 | Cornwall et al. |
| 2011/0085322 A1 | 4/2011 | Myer |
| 2011/0095867 A1 | 4/2011 | Ahmad |
| 2011/0122272 A1 | 5/2011 | Fergason |
| 2011/0133655 A1 | 6/2011 | Recker et al. |
| 2011/0134239 A1 | 6/2011 | Vadai et al. |
| 2011/0163694 A1 | 7/2011 | Donners |
| 2011/0184577 A1 | 7/2011 | Ilyes |
| 2011/0215735 A1 | 9/2011 | Herbst et al. |
| 2011/0215736 A1 | 9/2011 | Horbst et al. |
| 2011/0222301 A1 | 9/2011 | Knoedgen et al. |
| 2011/0227487 A1 | 9/2011 | Nichol et al. |
| 2011/0255303 A1 | 10/2011 | Nichol et al. |
| 2011/0273906 A1 | 11/2011 | Nichol et al. |
| 2011/0298422 A1 | 12/2011 | Failing |
| 2011/0301795 A1 | 12/2011 | Failing |
| 2011/0302078 A1 | 12/2011 | Failing |
| 2011/0307112 A1 | 12/2011 | Barrilleaux |
| 2012/0001566 A1 | 1/2012 | Josefowicz et al. |
| 2012/0020060 A1 | 1/2012 | Myer et al. |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0043909 A1 | 2/2012 | Bloom et al. |
| 2012/0044350 A1 | 2/2012 | Verfuerth |
| 2012/0059622 A1 | 3/2012 | Cacace et al. |
| 2012/0062123 A1 | 3/2012 | Jarrell et al. |
| 2012/0062128 A1 | 3/2012 | Spillman et al. |
| 2012/0080944 A1 | 4/2012 | Recker et al. |
| 2012/0086386 A1 | 4/2012 | Dibachi et al. |
| 2012/0086560 A1 | 4/2012 | Ilyes et al. |
| 2012/0086561 A1 | 4/2012 | Ilyes et al. |
| 2012/0091915 A1 | 4/2012 | Ilyes et al. |
| 2012/0129517 A1 | 5/2012 | Fox et al. |
| 2012/0136485 A1 | 5/2012 | Weber et al. |
| 2012/0136497 A1 | 5/2012 | Subbloie |
| 2012/0139426 A1 | 6/2012 | Ilyes et al. |
| 2012/0143383 A1 | 6/2012 | Cooperrider et al. |
| 2012/0146518 A1 | 6/2012 | Keating et al. |
| 2012/0147604 A1 | 6/2012 | Farmer |
| 2012/0153868 A1 | 6/2012 | Gu et al. |
| 2012/0190386 A1 | 7/2012 | Anderson |
| 2012/0194352 A1 | 8/2012 | Ellis et al. |
| 2012/0206050 A1 | 8/2012 | Spero |
| 2012/0218738 A1 | 8/2012 | Alexander et al. |
| 2012/0230696 A1 | 9/2012 | Pederson |
| 2012/0243231 A1 | 9/2012 | Vadai et al. |
| 2012/0251123 A1 | 10/2012 | Pederson et al. |
| 2012/0262093 A1 | 10/2012 | Recker et al. |
| 2012/0282815 A1 | 11/2012 | Aurongzeb et al. |
| 2012/0306382 A1 | 12/2012 | Maxik et al. |
| 2013/0015783 A1 | 1/2013 | Herbst |
| 2013/0038221 A1 | 2/2013 | Cleland et al. |
| 2013/0040471 A1 | 2/2013 | Gervais et al. |
| 2013/0044444 A1 | 2/2013 | Creighton et al. |
| 2013/0057158 A1 | 3/2013 | Josefowicz et al. |
| 2013/0058352 A1 | 3/2013 | Goergen et al. |
| 2013/0069998 A1 | 3/2013 | Fergason |
| 2013/0082606 A1 | 4/2013 | Viner et al. |
| 2013/0107041 A1 | 5/2013 | Norem et al. |
| 2013/0134880 A1 | 5/2013 | Rea et al. |
| 2013/0135118 A1 | 5/2013 | Ricci |
| 2013/0141252 A1 | 6/2013 | Ricci |
| 2013/0144453 A1 | 6/2013 | Subbloie |
| 2013/0144460 A1 | 6/2013 | Ricci |
| 2013/0144469 A1 | 6/2013 | Ricci |
| 2013/0144486 A1 | 6/2013 | Ricci |
| 2013/0144520 A1 | 6/2013 | Ricci |
| 2013/0147638 A1 | 6/2013 | Ricci |
| 2013/0155085 A1 | 6/2013 | Fergason |
| 2013/0155702 A1 | 6/2013 | Rea et al. |
| 2013/0175947 A1 | 7/2013 | Hamel et al. |
| 2013/0181609 A1 | 7/2013 | Agrawal |
| 2013/0181614 A1 | 7/2013 | Agrawal |
| 2013/0181636 A1 | 7/2013 | Agrawal |
| 2013/0187552 A1 | 7/2013 | Frodsham et al. |
| 2013/0193868 A1 | 8/2013 | Bueno et al. |
| 2013/0210252 A1 | 8/2013 | Ilyes |
| 2013/0211613 A1 | 8/2013 | Praske et al. |
| 2013/0221944 A1 | 8/2013 | Cheng et al. |
| 2013/0241419 A1 | 9/2013 | Ghafoori et al. |
| 2013/0249409 A1 | 9/2013 | Vanwagoner et al. |
| 2013/0250618 A1 | 9/2013 | Nichol et al. |
| 2013/0253713 A1 | 9/2013 | Vanwagoner et al. |
| 2013/0257284 A1 | 10/2013 | Vanwagoner et al. |
| 2013/0257289 A1 | 10/2013 | Vanwagoner et al. |
| 2013/0257291 A1 | 10/2013 | Tabor |
| 2013/0272125 A1 | 10/2013 | Espina Perez et al. |
| 2013/0285556 A1 | 10/2013 | Challapali et al. |
| 2013/0293117 A1 | 11/2013 | Verfuerth |
| 2013/0293877 A1 | 11/2013 | Ramer et al. |
| 2013/0297212 A1 | 11/2013 | Ramer et al. |
| 2013/0320193 A1 | 12/2013 | Liken et al. |
| 2013/0334970 A1 | 12/2013 | Jarrell et al. |
| 2013/0342131 A1 | 12/2013 | Recker et al. |
| 2013/0346229 A1 | 12/2013 | Martin et al. |
| 2014/0028144 A1 | 1/2014 | Parviainen et al. |
| 2014/0028200 A1 | 1/2014 | Van Wagoner et al. |
| 2014/0035482 A1 | 2/2014 | Rains, Jr. et al. |
| 2014/0036473 A1 | 2/2014 | Agrawal |
| 2014/0037297 A1 | 2/2014 | Pederson |
| 2014/0049166 A1 | 2/2014 | Yoon |
| 2014/0049983 A1 | 2/2014 | Nichol et al. |
| 2014/0056028 A1 | 2/2014 | Nichol et al. |
| 2014/0070731 A1 | 3/2014 | Chakravarty et al. |
| 2014/0071681 A1 | 3/2014 | Ghafoori et al. |
| 2014/0078308 A1 | 3/2014 | Verfuerth |
| 2014/0084795 A1 | 3/2014 | Cumpston et al. |
| 2014/0094136 A1 | 4/2014 | Huang |
| 2014/0097758 A1 | 4/2014 | Recker et al. |
| 2014/0111098 A1 | 4/2014 | Amarin et al. |
| 2014/0112537 A1 | 4/2014 | Frank et al. |
| 2015/0257229 A1 | 9/2015 | Wassel et al. |
| 2016/0113096 A1 | 4/2016 | Wagner et al. |

FOREIGN PATENT DOCUMENTS

| | | |
|---|---|---|
| JP | 2000277268 | 10/2000 |
| JP | 2006140026 | 1/2006 |
| JP | 2009004279 | 1/2009 |

OTHER PUBLICATIONS

Non-Final Office Action for U.S. Appl. No. 14/882,843, mailed Feb. 10, 2017, 9 pages.
Office Action for U.S. Application No. CA 2,908,751, mailed Dec. 8, 2016, 2 pages.

* cited by examiner

LIGHTING CONTROL WITH AUTOMATED ACTIVATION PROCESS

CROSS-REFERENCE TO RELATED APPLICATIONS

The present application claims priority to U.S. Provisional Patent Application No. 62/064,233, filed on Oct. 15, 2014, entitled "LIGHTING CONTROL WITH AUTOMATED ACTIVATION PROCESS," the contents of which are hereby incorporated by reference in their entirety for all purposes.

BACKGROUND

The present disclosure generally relates to lighting control devices, network systems, and methodologies, including automated activation sequences for detecting and setting various control parameters.

In the case of some networked control systems for outdoor lights (luminaires), human technicians perform a computer assisted activation/commissioning process. For example, during the installation and activation of an intelligent luminaire manager, selected information such as the intelligent luminaire manager's identification number, GPS grid coordinates for the location of the installation, the type of light equipment being controlled, a digital photo of the installation, and/or initial equipment parameters may be collected by maintenance personnel with the aid of the PDA hosted field unit. This information may then stored in the owner/operator's maintenance system records. In some cases, the PDA hosted field unit may be able to communicate with intelligent luminaire managers, as well as other "master controllers," to receive information and/or upload information.

However, as with other human processes, aspects of current techniques may be relatively labor intensive, particularly for large-scale lighting systems, and allow for error related to, for example, manual information entry and/or changes to, misidentification, and/or unrecognized system components, etc.

SUMMARY

According to first aspects of the disclosure, systems and methods that provide lighting control, such as intelligent photo control, and automatically detect or otherwise determine key characteristics of the fixture to which it is installed, are provided. In some examples, this can reduce or eliminate the need for manual commissioning to support diagnostic monitoring. This may also reduce or eliminate the human data entry component of commissioning, e.g. by incorporating it into photo control firmware functionality and network operation center (NOC) software functionality.

According to further aspects of the disclosure, a lighting fixture control system may include a control station configured to communicate with a plurality of fixture control devices located remotely from the control station; and a node including a lighting fixture and a fixture control device that is associated with the lighting fixture. The fixture control device may be located remotely from the control station, and configured to perform an automatic activation operation. In embodiments, the automatic activation operation may include the fixture control device determining auto-activation information including one or more of an identifier of the node, a GPS coordinate of the node, an operating Voltage of the node, a lamp Wattage of the lighting device, a lamp type of the lighting fixture, and a dimming capability of the lighting fixture. In embodiments, the fixture control device may be configured to send results of the automatic activation operation to the control station. In embodiments, the control station may be configured to store a file associated with the node, the file including the received results of the automatic activation operation.

In embodiments, the results may include a node identification number, GPS coordinates of the node, operating Voltage as seen by the node, lamp Wattage of the lighting fixture, type of lamp of the lighting fixture, and/or a dimming capability of the lighting fixture.

In embodiments, the results may include an exception flag, indicating at least one of that an expected element of information was not obtained by the automatic activation operation, or that an element of information obtained by the automatic activation operation is outside of a predetermined range.

In embodiments, the automatic activation operation may be performed during an initial registration process of the node with the control station, and may be performed again after the initial registration process of the node with the control station.

In embodiments, the automatic activation operation may include storing an auto-activation complete flag in memory of the node, and the fixture control device may be configured to check for the auto-activation complete flag on at least some power cycles to determine if auto-activation needs to be performed.

In embodiments, the control station may be configured to determine whether the node should execute another automatic activation operation, and to send a message to the node to reset the auto-activation complete flag based on said determining.

In embodiments, the control station may be configured to accept or reject the results based at least in part on node identifier.

In embodiments, the fixture control device may be configured to enter a dimming learning mode during the automatic activation operation, and to determine the dimming capability of the lighting fixture based at least in part on the dimming learning mode.

According to further aspects of the disclosure, a lighting fixture controller may include a processor, a first interface, coupled to the processor, and configured to communicate with a lighting fixture, and a second interface, coupled to the processor, and configured to communicate with a control station. In embodiments, the control station may recognize the combination of the lighting fixture controller and the lighting fixture as a node. The lighting fixture controller may further include memory with computer-executable instruction that configure the processor to perform operations including determining whether to perform an automatic activation operation for the lighting fixture controller, and cause the lighting fixture controller to determine auto-activation information based on a determination that the automatic activation operation should be performed. In embodiments, the auto-activation information may include an identifier of the node, a GPS coordinate of the node, an operating Voltage of the node, a lamp Wattage of the lighting fixture, a lamp type of the lighting fixture, and/or a dimming capability of the lighting fixture.

In embodiments, the lighting fixture controller may be configured to send results of the automatic activation operation to the control station via the second interface, and/or to store at least part of the results in the memory.

In embodiments, the results may include a node identification number, GPS coordinates of the node, operating Voltage as seen by the node, lamp Wattage of the lighting fixture, type of lamp of the lighting fixture, and a dimming capability of the lighting fixture.

In embodiments, the results may include an exception flag, indicating at least one of that an expected element of information was not obtained by the automatic activation operation, or that an element of information obtained by the automatic activation operation is outside of a predetermined range.

In embodiments, determining whether the automatic activation operation should be performed may include checking for an auto-activation complete flag.

In embodiments, the controller may be further configured to set an auto-activation complete flag based at least in part on completion of the automatic activation operation, to receive a reset signal from the control station, and/or to reset the auto-activation complete flag based at least in part on the reset signal.

In embodiments, the controller may be configured to enter a dimming learning mode during the automatic activation operation, and to determine the dimming capability of the lighting fixture based at least in part on the dimming learning mode.

According to further aspects of the disclosure, a lighting fixture control system may include a processor, a communication device, and memory including computer-executable instruction that configure the processor to perform operations including receiving, via the communication device, an automatic activation message for a node including a remote lighting control module and a lighting fixture associated with the lighting control module, the automatic activation message including a node identifier, validating the automatic activation message based at least in part on the node identifier, and storing information associated with the node based at least in part on the validation. In embodiments, the information associated with the node may include a GPS coordinate of the node, an operating Voltage of the node, a lamp Wattage of the lighting fixture, a lamp type of the lighting fixture, and/or a dimming capability of the lighting fixture.

Embodiments may include enabling and/or altering a control option in a user interface based at least in part on the information associated with the node, and sending, via the communication device, commands to the lighting control device based on an input received via the user interface.

In embodiments, the information associated with the node may be received during an initial registration process of the node with the control station.

In embodiments, at least some of the information associated with the node may be updated based at least in part on another automatic activation message received from the node.

In embodiments, the system may be further configured to determine whether the node should execute an automatic activation operation, and to send a message to the node to reset an auto-activation complete flag based on said determining.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Various example embodiments of the present disclosure will be described below with reference to the drawings constituting a part of the description.

Figure 1:
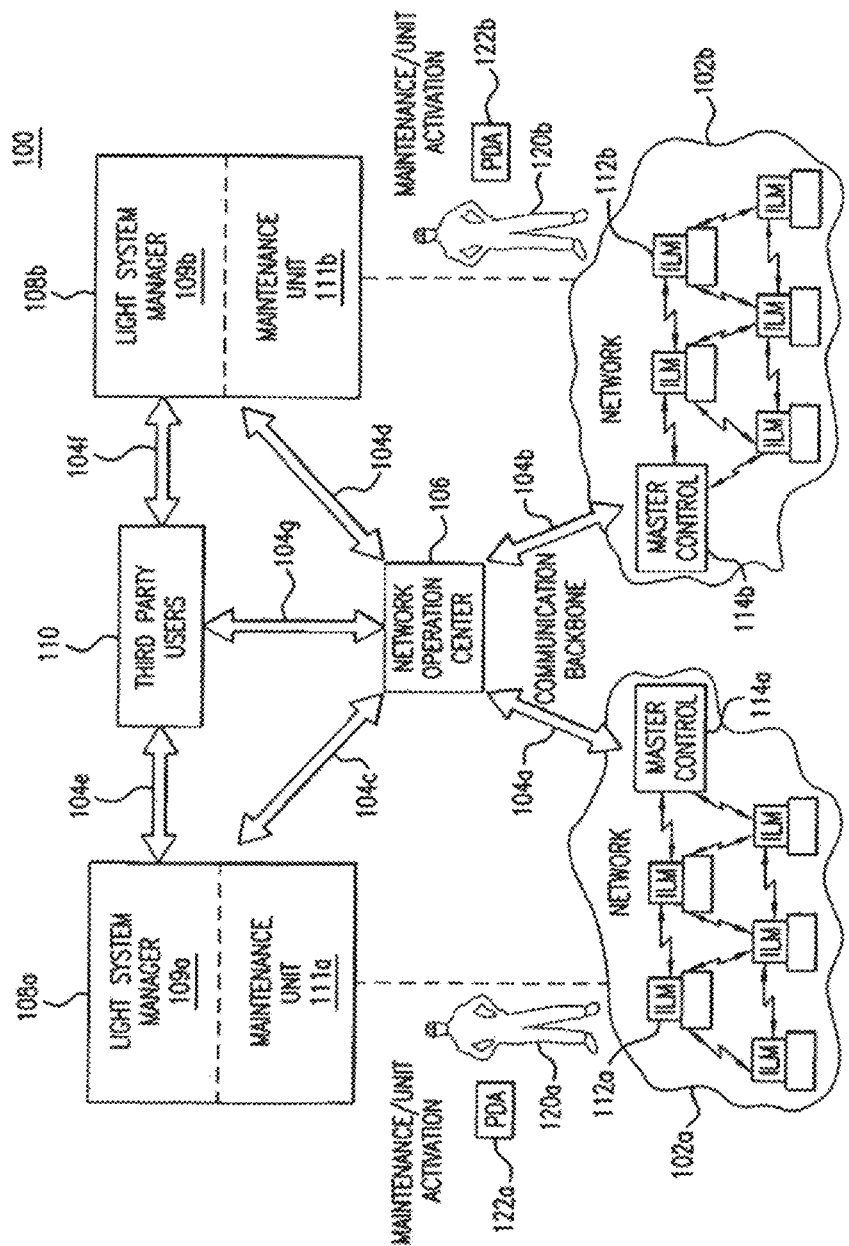
FIG. 1 depicts aspects of a lighting control network in which auto-activation processes may be implemented, according to certain embodiments of the present disclosure.

FIG. 1, from U.S. Pat. No. 8,594, generally illustrates an environment in which a light management system 100, having networked intelligent luminaire managers 112, may be modified and/or incorporate aspects of the present disclosure.

As shown in FIG. 1, a light management system 100 includes networks 102a and 102b, a network operation center 106, light system owner/operators 108a and 108b, and third-party users 110. These subsystems of system 100 are linked together using appropriate communication means such as, for example, radio frequency communications, optical communications and/or power line carrier to form communications backbone 104.

Each of the networks 102a and 102b includes several intelligent luminaire managers (ILMs) 112 and a master control 114. The intelligent luminaire managers 112 communicate with each other and with master controller 114 using, for example, short-range radio frequency (RF) communication links. In some examples, these RF communication links may operate in the 900 MHz unlicensed band and have a range of about 1000 feet, but it will be appreciated that other frequencies and ranges may be utilized as well. Each of the intelligent luminaire managers 112 may control operation and/or diagnostics of a light fixture, street light, etc., which may also be referred to as a luminaire. It should be appreciated that, as discussed further below, incorporation of techniques described herein may significantly reduce both the amount of work manually performed during activation of ILMs by technicians, such as 120a and 120b, and reduce or eliminate the use of PDA hosted field units, such as 122a and 122b.

According to aspects of the disclosure, intelligent luminaire managers may include one or more processors, memory, and an interface subsystem. The memory may store a variety of programs that are executed and/or implemented using the processor. These programs may include, for example, a luminaire control program, luminaire and intelligent luminaire manager configuration program, status reporting program, and other optional programs, such as an automated activation program discussed further herein.

In some examples, auto-activation may facilitate installation of a particular control module, such as an integral dimming control (IDC), on a fixture in a light management system, with minimal user interaction. This may include collecting data that will be used by the a light management system for general diagnostics and location mapping of the fixture. In some examples, the control module, alone or in combination with a fixture, may be referred to as a node, and activation data collected may include one or more of: a node identification number, location of the node (e.g. GPS coordinates), system voltage as seen by the node, lamp wattage, type of lamp in the fixture, a consumer and/or manager associated with the node, characteristics of a dimming driver, and/or other fixture-specific details. Once the node has collected the relevant activation data, the node may generate an event that contains at least part of the collected activation data as well as any further information that the node may be programmed to determine based at least in part on the activation data.

In some examples, the NOC may use this data for displaying to a user fixture-specific information for the node. In addition to the collected activation data, the node may report certain exceptions that were detected during the activation process. In some examples, a system configuration (that may be set during manufacturing time) may also be sent to the NOC at that time. Once the activation process has completed, the node may store (e.g. in persistent storage), or caused to be stored, an auto-activation complete flag. This flag may be checked on all, or some, power cycles to determine if auto-activation needs to be performed. In some examples, the NOC may determine that a node should execute another auto-activation sequence, and send a message to reset the flag.

FIGS. 2-7 depict flow diagrams of auto-activation sequences for lighting control as described herein. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

FIG. 1 depicts an auto-activation main sequence 200. As shown in FIG. 1, the auto-activation main sequence 200 may begin with the system checking to see whether an auto-activation complete flag is set in 210. This may be programmed for example, to execute during every power cycle, according to a certain power cycle schedule, and/or based on a specific execution command. If the auto-activation complete flag is set, the flow may proceed to end at 260. If the auto-activation complete flag is not set, the flow may proceed with a GPS check in 212, in which a determination may be made regarding whether a certain number of GPS readings have been collected. If the number of GPS readings have not been collected, the flow may continue with 220, collecting GPS readings until 212 is satisfied. If the number of GPS readings have been collected, the flow may continue with 222, in which a determination is made regarding whether the system Voltage (e.g. for the node) has been determined. If no, the flow may proceed with 224, in which the system Voltage is read. After the system Voltage is determined in 222, or read in 224, the flow may proceed with 230, in which a determination is made regarding whether a lamp type has been previously determined (e.g. previously tested, stored, or otherwise acquired). If no, the flow may proceed with 232, in which the lamp type may be determined. After the lamp type is determined in 232, or read in 230, the flow may proceed with 230, in which a determination is made regarding whether a lamp Wattage has been determined. If no, the flow may proceed with 240, in which a testing condition may be checked, e.g. to see whether the lamp Wattage can be read at that time based on the time that the lamp has been on with dimmer output set to maximum. If the condition is not satisfied, the flow can optionally await satisfaction of the condition at 240, or simply proceed to end 260, and attempt reinitiating the flow 200 or step 240 at a later time, or command initiate based on a later determination that the condition has been satisfied. After the condition in 240 is satisfied, the flow may proceed with 242, in which the lamp Wattage may be determined. After the lamp Wattage is determined in 242, or read in 234, the flow may proceed with 250, in which a determination is made regarding whether a dimmer driver has been characterized. If no, the flow may proceed with 252, in which the dimmer driver may be characterized. After the dimmer driver is characterized in 252, or read in 250, the flow may proceed with 254, in which a determination is made regarding whether all auto-activation data has been collected. If no, the flow may proceed to end 260, and any exceptions may be stored and/or communicated to a control center (e.g. a NOC). If yes, the flow may proceed with 256 in which the auto-activation data) or parts thereof) may be sent to the control center. In 258, an auto-activation complete flag may be set, and the flow continues to end 260.

Figure 2:
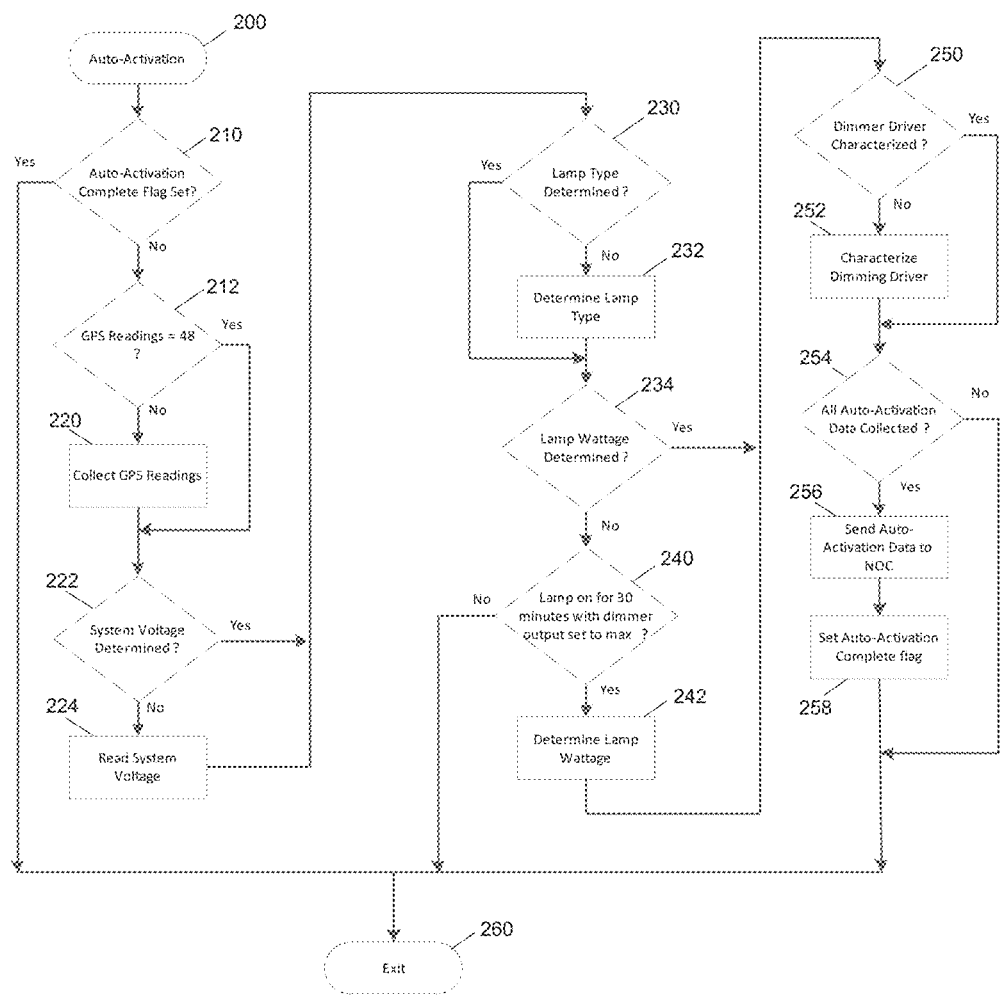
FIG. 2 is a process flow for an auto-activation operation, according to an exemplary embodiment of the present disclosure.

As mentioned above, lighting control auto-activation processes discussed herein may include other steps, including additional steps not necessarily depicted in FIG. 2. For example, an identification number, such as a MAC ID, may be determined and associated with other location information, system voltage, lamp type, lamp wattage, a consumer and/or manager associated with the node or fixture, characteristics of a dimming driver, and/or other fixture-specific details, additional details of which are described herein.

With respect to node identifiers, such as a MAC ID, a light management system may include stored information including node identifiers (also referred to as access IDs). In some embodiments the access IDs corresponding to the nodes may be globally unique, e.g., such as a MAC address, or unique only to a group of nodes, such as those within the scope of a building where the node is located. In some cases, each node may have a unique MAC address or other identifier, such that a message, instruction or query, e.g. from a control center server, can be sent to a particular fixture by appending the particular lighting device's MAC address or other identifier to the preamble of a packet. Thus, only the node with the matching MAC address decodes the received packet.

In some examples, an auto-activation process may include transmission of a MAC ID or other identifier to a NOC, where it may be stored in the NOC database. In some examples, the MAC ID or other identifier may be provided in an activation data packet, e.g. after acquisition of the other relevant activation data, and may be required to allow a node to register and participate in a mesh network controlled by the NOC. Thus, the NOC may effectively prevent the node from communicating any data to the NOC via mesh until registration occurs.

Upon acknowledgment of the activation data packet (with or without other activation data), the NOC may assign an 'Activation' status to the node.

In some examples, the node is configured to store at least some of the results of the automatic activation operation in memory. The NOC may also be configured to initiate an override communication sequence to the node that causes the node to modify data which was stored in the memory of the node during the automatic activation operation. For example, the NOC can receive data from the node that the NOC wants to change (for any reason). The NOC generates a message to the node, and directs that the data be modified in the node's memory. In some situations, the NOC may fix this data, such that subsequent automatic activation operations do not override the modified values.

Further details regarding exemplary steps in the auto-activation process are depicted in FIGS. 3-7 and described further below.

System voltage may be determined as part of an initial or repeat activation process. In this regard, a control module, or external resource such as a NOC, may be configured to store tables of expected voltages for known systems, e.g. with nominal voltage and acceptable ranges associated with one or more fixture type(s), etc. Accordingly, certain fixture models may be identified and/or distinguished from other models by examination of line voltage sampling results, e.g. differentiating between 120V and 240V fixture models, based on detected line voltage versus expected ranges. In situations where different models have relatively close voltage ranges, a single high/low voltage threshold pair may be used to determine between the models.

Figure 3:
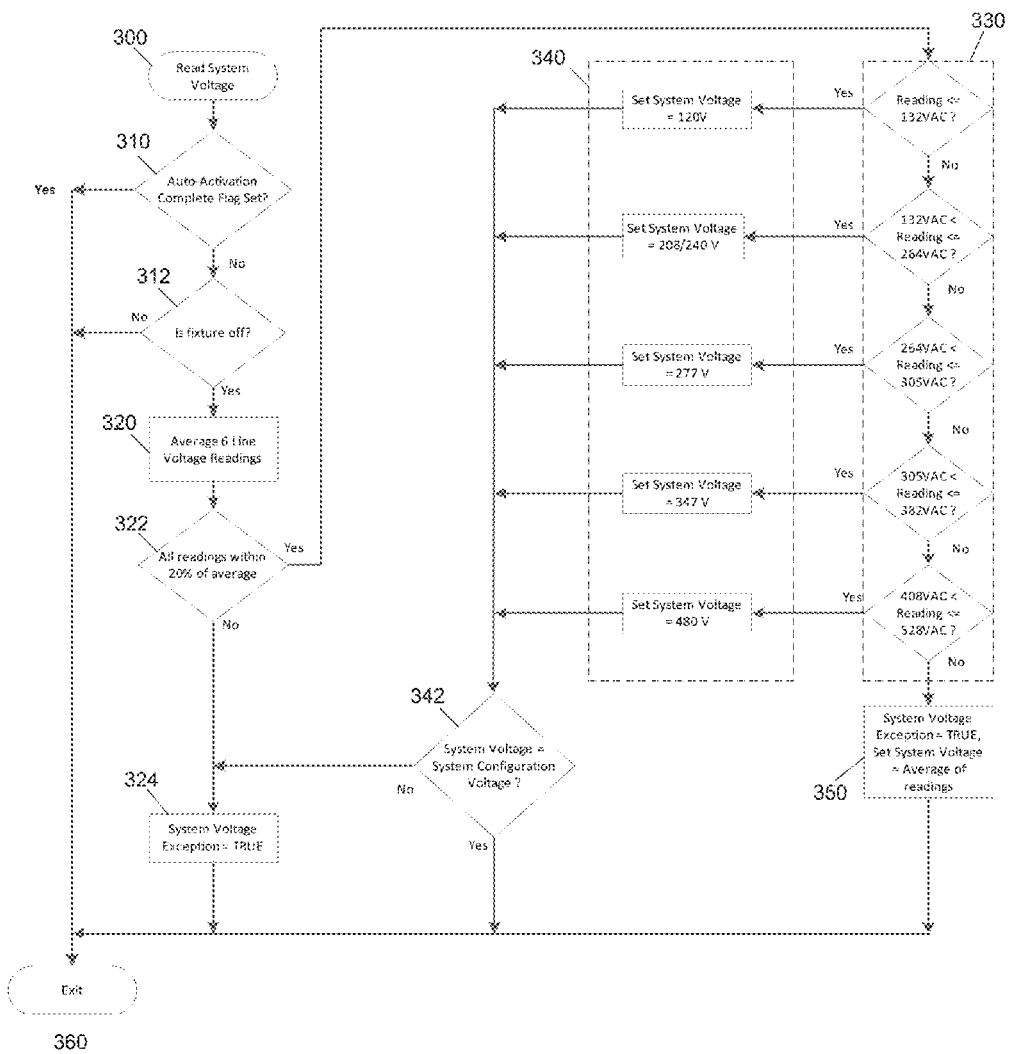
FIG. 3 is a process flow for a system Voltage determination used in an auto-activation operation, according to an exemplary embodiment of the present disclosure.

FIG. 3 depicts an exemplary Auto-Activation: Read System Voltage flow diagram, according to aspects of the disclosure. As shown in FIG. 3, Read System Voltage flow 300 may begin by checking to see whether a auto-activation complete flag is set in 310. If yes, the flow may continue to end 360. If no, the flow may proceed to 312, in which a test condition may be determined, e.g. to see whether a Voltage reading can be observed for the node. In this case, 312 determines whether the lighting fixture is off. If so, the flow may proceed to exit at 360. If not, the flow may proceed to 320, in which average Voltage readings are taken.

Line voltage sampling used by a node to determine activation voltage may be taken during "lamp off" conditions. In some examples, if the lamp status is not "off" at the end of an auto-activation data gathering period, e.g. due to group control or scheduling, then the "lamp on" condition voltage may be used as a fallback.

In 322, the Voltage readings may be analyzed to ensure that they appear to be error free, e.g. by ensuring that they are all within a certain percentage of one another. If not, the flow may proceed to 324, in which a system voltage exception may be generated, and the flow proceeds to exit at 360. As mentioned previously, exceptions may be communicated to control centers, stored at the fixture controller, etc. If 322 determines that the readings are acceptable, the flow proceeds to 330, in which the average Voltage may be compared to a series of Voltage ranges to determine the system Voltage. For example, a first range may be below a certain threshold that is slightly above the lowest expected system Voltage. In this case, the low end is set to anything less than 132 VAC, and a positive result leads to a determination in 340 that the system Voltage is 120 VAC. Various ranges may be provided in 330 with corresponding system Voltage determinations in 340, up to a maximum value. After establishing a system Voltage in 340, the flow may continue with 342 in which the system Voltage is compared to a system configuration Voltage. If these values do not match, the flow may proceed to 324, in which a system Voltage exception is generated. If the values match in 342, the flow may proceed to exit 360. If the average Voltage does not fall within any of the ranges 330, the flow may proceed to 350, in which a system Voltage exception may be generated, and the flow proceeds to exit 360.

In some examples, information regarding faults in the distribution system (e.g. loss of neutral) may be used by the control module or NOC to discard or suspend voltage determination(s), and reset this portion of the activation process.

In some examples, an activation voltage may be selected based on an average of interval average voltages from multiple reporting intervals. If the resultant average voltage does not fall into any known device/model ranges, an exception flag may be set in memory of the control module and/or sent to an NOC in an activation message. In some examples, an exception flag may also be stored and/or sent if any of the voltage data points lies outside of a window around the average. The window may be, for example, a fixed percentage of the known or detected voltage range, or a dynamic range based at least in part on overall range, mean, or differentials of the detected voltages.

In some examples, the stored ranges may have a model with the lowest voltage among other known models, and any line voltages less than a certain value may be determined to correspond to the lowest voltage model. In some examples, the stored ranges may have a model with the highest voltage among other known models, and any line voltages greater than a certain value may be determined to correspond to the highest voltage model.

Lamp type (e.g. LED, HPS, MH, etc.) may also be determined as part of an initial, or repeat, activation process. In some example, a lamp type check may be initiated in all activations, or may be triggered on or off based on one or more parameters, such as whether a lamp is present, whether the lamp type is known from other activation data, etc. In some examples, determining the lamp type may include determining a lamp wattage diagnostic path in order to, for example, limit reference tables according to lamp type.

Figure 4:
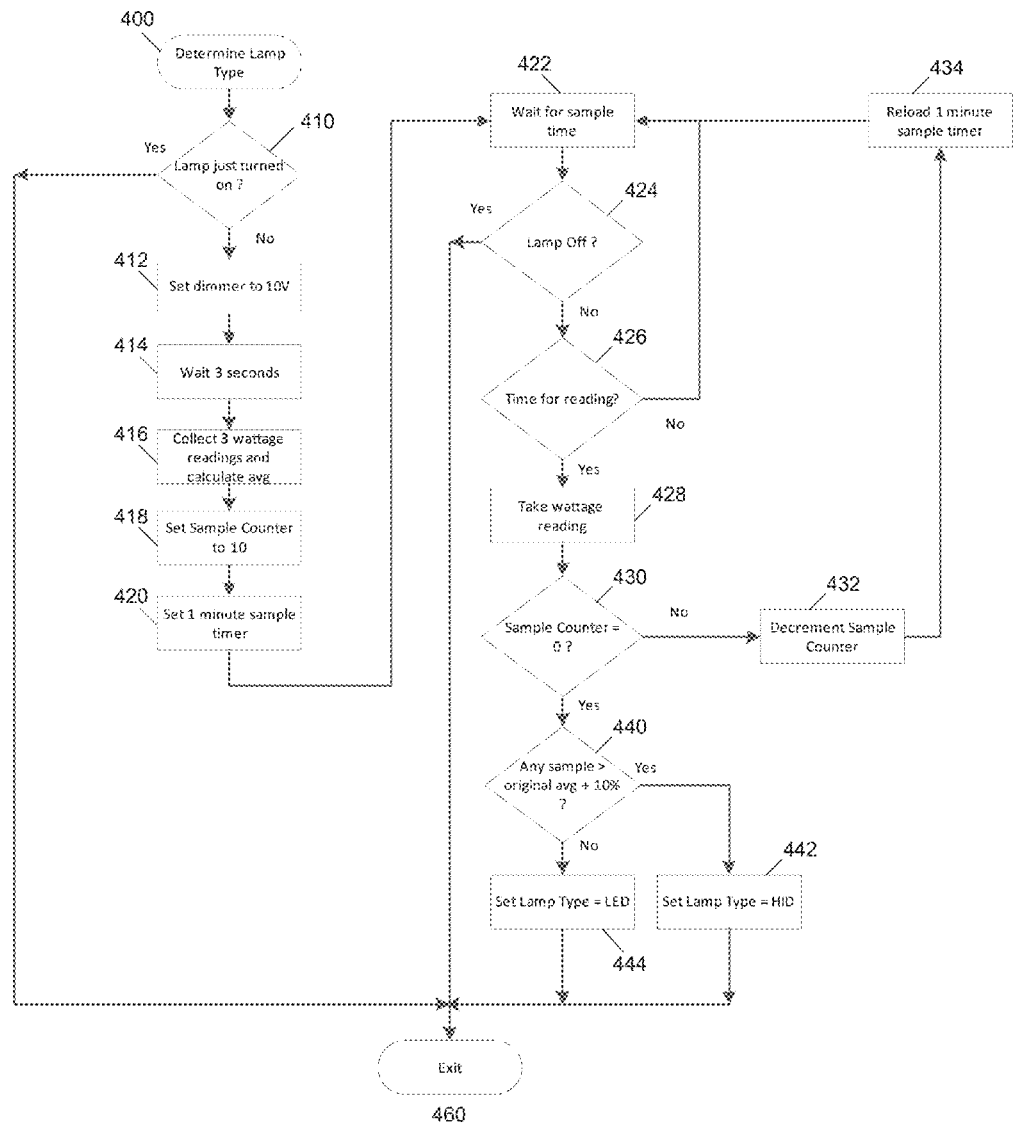
FIG. 4 is a process flow for a lamp type determination used in an auto-activation operation, according to an exemplary embodiment of the present disclosure.

FIG. 4 depicts an exemplary Auto-Activation: Determine Lamp Type process flow, according to further aspects of the disclosure.

One or more lamp type activation attributes may be collected, and transmitted to the NOC, e.g. so that the NOC can ascertain which diagnostic limit table entry to refer to when assigning diagnostic status for Excessive Power, Low Wattage and Fixture Malfunction. In some examples, if a Lamp Type attribute is missing in an activation message, the NOC may automatically assign OI diagnostic status.

In some examples, determining lamp type may include setting a dimming output to a certain level when the load is initially energized, and recording and averaging load wattage (LoadW) measurements over a period of time. Such sampling may be performed multiple times. Different lamp types may show different characteristics under such conditions, and the lamp type may be identified based on comparing the results to tables or processing via algorithms including appropriate operations. For example, if any of the samples differ from an InitLW by more than a certain percentage of InitLW, then the lamp type may be inferred to be an HID. Or, if none of the samples differ from InitLW by more than a certain percentage of InitLW, then the lamp type may be inferred to be an LED. In some examples, a minimum sample time or cycle count may be set and, if the lamp turns off during the before the minimum time/cycles are complete, the lamp type detection may be aborted and reinitiated during the next on cycle. Other means of distinguishing between various lamp types are also possible, and may include various measurements and analysis of electrical load characteristics over time. Additionally, in some cases, automated fixtures or lamps themselves may be configured such that the lamp type can be read from the fixtures or lamp by the control module.

The flow 400 may begin by determining in 410 whether the lamp was turned on within a predetermined time. If yes, the flow may proceed to exit 460. If no, the flow may continue with 412 in which the dimming control may be set to a first value (in this case max 10V). The flow may wait a predetermined period of time in 414, and proceed to take Wattage readings and calculate an average in 416. A sample counter may be set in 418, and sample timer set in 420. The flow may pause in 422 while the sample timer runs, after which the flow may continue with 424. In 424, a determination is made regarding whether the lamp has been turned off, e.g. while waiting for the sample timer. If the lamp is off, the flow may continue to exit at 460. If the lamp is on, the flow may proceed to 426, in which a test condition may be analyzed before taking another Voltage readings. In this case, it is determined whether it is the correct time for the next reading. If not, the flow continues back to 422 to wait for the sample to run. If it is time for a reading in 426, the flow proceeds to 428, during which the next reading is taken. The flow proceeds to 430, in which a sample counter is analyzed to see whether additional samples are needed. If the counter is still greater than zero, the flow can proceed to 432, in which the sample counter is decremented and the flow proceeds with 434. In 434, the sample timer is reset and the flow returns to 422, beginning a new Wattage reading cycle. If the sample counter in 430 is zero, the flow may proceed with 440, in which a determination is made that distinguished between different types of lighting fixtures. In this case, it determines whether any sample is 10% greater than the average. If so, the flow proceeds with 442, determines that the light is an HID, and proceeds to exit at 460. If not, the flow proceeds to 444, determines that the light is an LED, and proceeds to exit at 460.

Control modules may be configured to distinguish between HID and LED fixtures, and between at least some different types of HID fixtures such as MH, MV, LPS, HPS.

Lamp wattage (e.g. 25-1000 W) may also be determined as part of an initial, or repeat, activation process. In some examples, the lamp wattage may be used, for example, as a reference for certain diagnostics, such as low wattage detection, fixture malfunction limits derived from activation data, etc.

Figure 5:
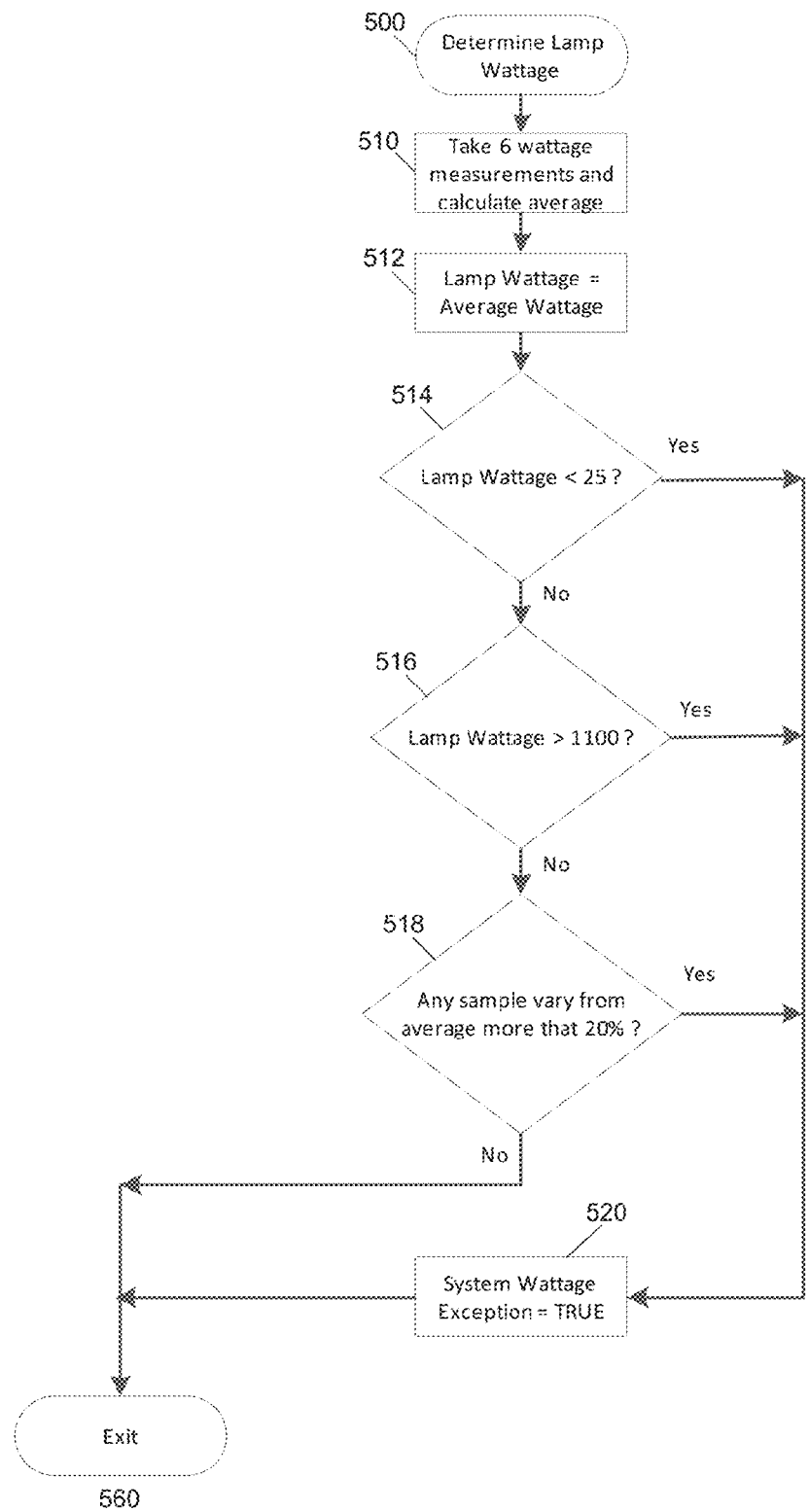
FIG. 5 is a process flow for a lamp Wattage determination used in an auto-activation operation, according to an exemplary embodiment of the present disclosure.

FIG. 5 depicts an exemplary Auto-Activation: Determine Lamp Wattage process flow, according to further aspects of the disclosure.

In some cases, a reliable activation process may assume that the fixture is working normally at the time of activation, and may determine if the line voltage is within the normal and correct range for the fixture. If either of these do not appear to be correct, e.g. based on other auto-activation data or other information available to the control module, an exception flag may be generated, and the activation process may be reinitiated at a later time. Load wattage sampling that will be used by the node to determine activation wattage may be taken during lamp on conditions. In some examples, activation wattage may be determined based on an average of interval average wattage from multiple reporting intervals. In some examples, control modules may be configured to obtain such samples beginning some predetermined time after lamp "on" event.

As shown in FIG. 5, the flow 500 may begin with taking Wattage measurements and averaging them in 510. A lamp Wattage may be set to the average Wattage in 512. In 514, the lamp Wattage may be compared to a first value, e.g. a minimum value, below which a system Wattage exception is generated, as in 520. If the lamp Wattage is not less than the minimum value, the flow may proceed with 516, in which the lamp Wattage may be compared to a second value, e.g. a maximum value, above which a system Wattage exception is generated, as in 520. If the lamp Wattage is not greater than the maximum value, the flow may proceed with 518, in which each of the lamp Wattage sample values may be compared to a third value, e.g. a maximum deviation, above which a system Wattage exception is generated, as in 520.

Accordingly, if any of the recorded wattage data points lies outside of a predetermined, or dynamically set, window around an expected or recorded average, then an exception flag may also be generated and stored by the control module and/or included in the activation message.

If the lamp status is never "on" at the end of a scheduled auto-activation data gathering period (e.g. some period of minutes, hours or days) due to group control or scheduling, then an exception flag may be generated and stored by the control module and/or included in the activation message.

If no exceptions are indicated in 514-518, the flow may proceed from 518 to exit at 560, with the lamp Wattage set to the average Wattage.

A dimming capability and/or configuration of the fixture, may also be determined as part of an initial, or repeat, activation process. For example, during a first lamp on cycle, and after the lamp has been on a given period of time, the control module may enter a dimming learning mode. In some examples, the control module may be configured to ensure that this does not coincide with either of the lamp type or lamp wattage determination processes. In some examples, the dimming learning mode may include one or more of setting a dimming output to a certain voltage (which may override any command/previous soft limit or schedule), delaying a given period of time, and taking a plurality of load wattage (LoadW) measurements and averaging them. The dimming learning mode may then save such information, e.g. for later processing and/or inclusion in an activation message.

In some examples, the dimming output may be set to a lower voltage (which may also override any command/ previous soft limit or schedule), delay a certain period of time, and then take another plurality of load wattage (LoadW) measurements and average them. This information may also be stored for later processing and/or inclusion in activation message.

Figure 6:
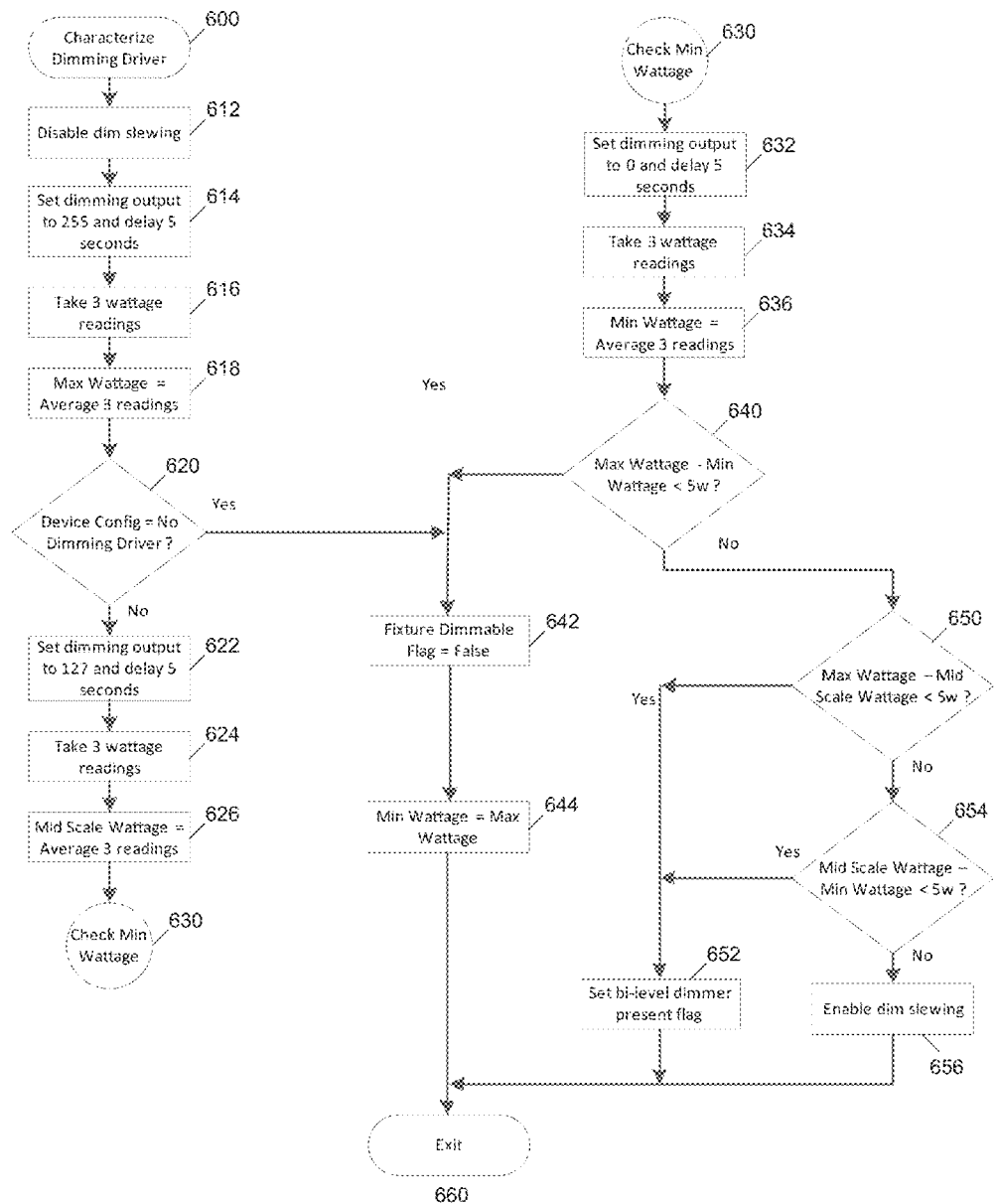
FIG. 6 is a process flow for a dimming characteristic determination used in an auto-activation operation, according to an exemplary embodiment of the present disclosure.

FIG. 6 depicts an exemplary Auto-Activation: Characterize Dimming Driver flow process according to further aspects of the disclosure. As shown in FIG. 6, the flow 600 may begin with 612, in which dim slewing may be disabled. The flow may continue with 614, in which a dimming output may be set to a predetermined (e.g. maximum) level, along with pausing the process for a period of time, e.g. 3-5 seconds. The flow may continue with 616, in which multiple Wattage readings are taken, and averaged in 618. In 620, a determination may be made regarding whether the a device configuration indicates no dimming driver. If a dimming driver is not ruled out, the flow may continue with 622-626, in which the dimming output is set to a second (e.g. mid-scale) level, and readings are again taken and averaged. The flow may proceed from 626 to 630, which initiates a similar minimum Wattage check. In 632-636, the dimming output is set to a third (e.g. minimum) level, and readings are again taken and averaged. In 640, the difference between the maximum and minimum Wattages may be determined and compared to a predetermined value to determine whether fixture is dimmable. For example, if the difference between the maximum and the minimum Wattage is less than 5 W, the flow may proceed to 642 and enter a "False" flag on whether the fixture is dimmable. Referring back to 620, this may also be arrived at if the device configuration indicates no dimming driver. The flow proceeds from 642 to 644, in which a minimum and maximum Wattage are set to equal values for the fixture, after which the flow continues to exit at 660. Returning to 640, if the difference between the maximum and minimum Wattages are not less than the predetermined value, the flow may proceed with 650, in which the maximum and mid-scale Wattages may be compared to determine if the fixture is a bi-level dimmer. In this case, if a difference between the maximum and mid-scale Wattages is less than a predetermined value, the flow continues to 652, in which the fixture is set as a bi-level dimmer. If that is not the case, the flow proceeds with 654, in which another comparison is made, in this case the difference between the mid-scale and minimum Wattages. If a difference between the mid-scale and minimum Wattages is less than a predetermined value, the flow continues to 652, in which the fixture is set as a bi-level dimmer. If that is not the case, the flow proceeds with 656, in which slewing is enabled for the fixture. The flow may continue from either of 652 or 656 to exit 660.

In some examples, the control module may compare the results of one or more of the foregoing steps, and determine whether or not the fixture has a dimming capability, e.g. by comparing a difference between MaxFixtureWattage and a MinFixtureWattage to a threshold amount, and may store and/or send a flag indicating whether the fixture is capable of dimming. Other testing and evaluation is also possible, for example, to set preferred operational limits for the fixture dimming.

After performing such steps, a dimming output control may be reset to normal, e.g. adhering to previous commands, soft limits or schedule(s).

In some examples, production or other factors may indicate that a fixture is not dimming equipped, and one or more functions of the dimming learning mode may be skipped by the control module upon detection/determination of such factors.

Location, such as GPS location (lat, long), may also be determined as part of an initial, or repeat, activation process, and can be used by the control module or the NOC to derive street address or other identifying information for the node. This may be used, for example, to display GUI icon location on a map display (e.g. at the NOC) driven by coordinates.

In some examples, a control module may contain a countdown value, e.g. stored in a general purpose register, which may be a default value from the factory. In some examples, the control module may enable and configure GPS radio before, or after, it registers with the NOC or control network.

In some examples, the control module may poll the GPS module for NMEA GGA after a predetermined period of time in acquisition mode.

The control module may extract the NMEA standard GGA message. Upon receipt of a good GGA message (correct formatting and valid fix flag set), the control module may store the NMEA message in memory (overwrite last) and may generate a GPS location event with the NMEA message and the current counter value as the payload. A sample counter in memory may be decremented.

Thereafter, if registered, the control module may continue to issue queries periodically for a new GGA, store the NMEA message in memory (overwrite last) and may generate another GPS location event with the NMEA message and the current counter value as the payload. The sample counter in memory may be decremented each time.

When the countdown value reaches zero, the above cycle may be terminated. Upon each fresh power-up and re-registration, the control module may send in periodic location events containing data collected as described above.

If control module finds that it cannot communicate with a GPS module (e.g. none installed) after a number of retries or given time, it may cease attempting to do so and include a GPS exception flag in the on-board activation record in memory and/or included in an activation message to the NOC.

When each GPS event from a given control module (corresponding to a MAC or other ID) is received by the NOC, it will add it to the database keyed by the ID it received it from.

When the activation report is received from the node after a predetermined learning period, it may be assumed that all activation period GPS location data sets were received. If not, it may continue accepting them for a given period and will then continue with a partial data set if a complete set were not received. If the GPS exception flag is present in the activation report, then the activation process may continue regardless of the number of GPS records were received.

In some examples, the NOC may calculate an average latitude and longitude, and the standard deviation for each, discarding any record where either latitude or longitude lies outside of a standard deviation window. For the remaining records, the NOC may calculate an average latitude and longitude and assign the result to the activation record set.

If additional GPS location records are received by the NOC (e.g. based on a power up event), the records may be averaged and evaluated against the current activation record coordinates. If the distance between the current activation data and newly generated average location is greater than a certain amount, the NOC may issue a command to the node to either initiate a new self-activation process or new GPS location derivation. The NOC may evaluate the reported voltage/wattage data against the activation data to make this determination.

During an initial timeframe after a control module is powered on, it may automatically perform several data collection and calculation activities. At the completion of this learning mode period, the node may send a report to the NOC which contains all of the activation data collected. In some examples, GPS data may be sent to the NOC on a regular basis as events and the data may be stored until the activation mode results report arrives.

Figure 7:
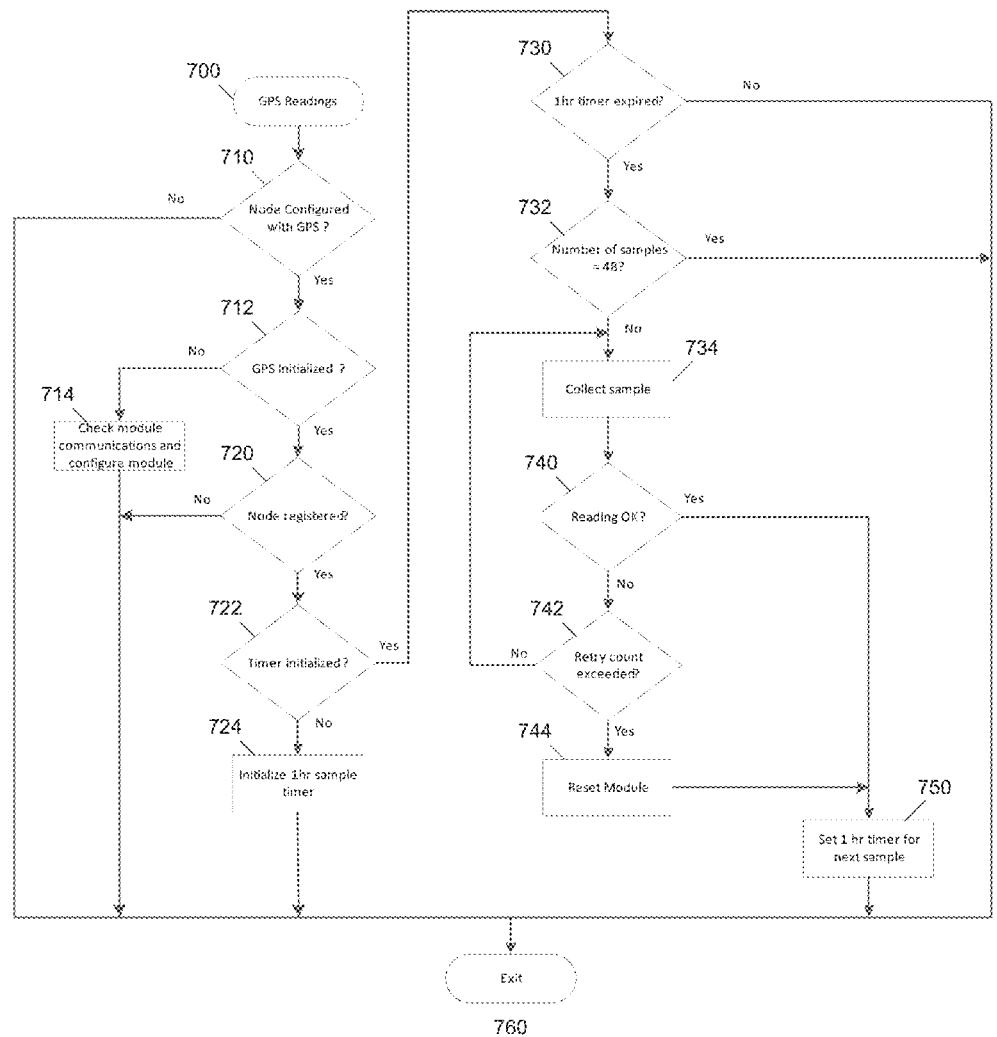
FIG. 7 is a process flow for a GPS determination used in an auto-activation operation, according to an exemplary embodiment of the present disclosure.

FIG. 7 depicts an exemplary Auto-Activation: Collect GPS Readings flow process, according to further aspects of the disclosure. As shown in FIG. 7, the flow 700 may begin with determining whether the node is configured with GPS (or other location-sensing technology) in 710. If not, the flow may proceed to exit 760. If the node is configured with GPS, the flow may continue with 712, in which a determination is made regarding whether the GPS is initialized. If not, the flow may continue with 714 and attempt to initialize the GPS before exiting in 760, and (possibly) restarting the process flow 700. If the GPS is initialized, the flow may continue with 720, and a check performed on whether the node is registered. If not, the flow may proceed to exit at 760. If the node is registered, a check may be performed in 722 as to whether a timer has been initialized. If not, the flow may proceed to 724, in which a sample timer is initialized, and the flow continues to exit 760 (e.g. while the new sample timer runs). If a timer is already initialized in 722, the flow may continue to 730 in which a determination is made regarding whether the timer has expired. If not, the flow may proceed to exit 760 (e.g. while the existing sample timer runs). If the timer has expired in 730, the flow may proceed with 732, in which a determination is made regarding a number of samples collected. If the number of samples is equal to a predetermined number, the flow may proceed to exit at 760. If the number of samples is not equal to the predetermined number, the flow may proceed to 734 to collect an additional sample. The flow may continue from 734 to 740, in which the sample may be checked for errors. If the reading is ok, the flow may proceed through 750, where a new sample timer is set, to exit 760. If an error is detected in 740, the flow may retry collection in 734 until no errors are detected in 740, or a retry count is exceeded in 742. If the retry count is exceeded in 742, the flow may proceed with resetting the module in 744 and setting a new sample timer in 750.

Once the Auto-Activation process has completed, a record may be stored by the control module and/or an event message may be generated and sent to the NOC. The data in this record and/or event may include one or more of, ID, Location, System Voltage, System Voltage Exception Flag, Lamp Type, Lamp Wattage, Lamp Wattage Exception Flag, Maximum Fixture Wattage, Minimum Fixture Wattage, Fixture Dimmable Flag, Bi-Level Dimmer Detected Flag, GPS Exception Flag, Line voltage configuration, GPS module configuration, Dimming configuration, etc.

In some examples, the NOC may match an activation message to a MAC ID that is already in the database. The NOC may also, for example, calculate a set of final GPS coordinates, determine FM, low wattage, excessive wattage thresholds, and other fixture attributes or control parameters based on the message payload.

In some examples, the NOC may enable/disable dimming UI for a node, enable/disable dimmed diagnostics and determine scaling to display if wattage-based control is desired.

In some examples, after receiving and verifying the activation message, the NOC may populate node/NOC activation record fields (some conditionally), and may move the node out of 'Activation' status, at which time normal diagnostics may commence. In some examples, an end user or remote service may populate extended attributes via a NOC portal or database during or after activation.

In some examples, the control module may be configured to respond to remote commands, e.g. via the lighting control network, that re-initiate the activation process within the control module.

The foregoing techniques may be used in networked lighting systems, and exchange information with a network operation center. Using the services of the network operation center and a computer connected to a network operation system (e.g., via a secure Internet link), an owner/operator, such as a municipal or other utility manager, is able to register, monitor and control their assigned lights.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a message" is a reference to one or more messages and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A lighting fixture control system, comprising:
   a control station configured to communicate with a plurality of fixture control devices located remotely from the control station; and
   a node including a lighting fixture and a fixture control device that is associated with the lighting fixture, located remotely from the control station, and configured to perform an automatic activation operation, wherein, the automatic activation operation includes the fixture control device determining at least four of:
an identifier of the node,
a GPS coordinate of the node,
an operating Voltage of the node,
a lamp Wattage of the lighting device,
a lamp type of the lighting fixture, and
a dimming capability of the lighting fixture;
wherein, the fixture control device is configured to send results of the automatic activation operation to the control station; and
wherein, the control station is configured to store a file associated with the node, the file including the received results of the automatic activation operation.

2. The system of claim 1, wherein the results include a node identification number, the GPS coordinate of the node, the operating Voltage of the node, the lamp Wattage of the lighting fixture, the lamp type of the lighting fixture, and the dimming capability of the lighting fixture.

3. The system of claim 1, wherein the results include an exception flag, indicating at least one of that an expected element of information was not obtained by the automatic activation operation, or that an element of information obtained by the automatic activation operation is outside of a predetermined range.

4. The system of claim 1, wherein the automatic activation operation is performed during an initial registration process of the node with the control station.

5. The system of claim 4, wherein the automatic activation operation is performed again after the initial registration process of the node with the control station.

6. The system of claim 1, wherein the automatic activation operation includes storing an auto-activation complete flag in a memory of the node, and the fixture control device is configured to check for the auto-activation complete flag on at least some power cycles to determine if auto-activation needs to be performed.

7. The system of claim 6, wherein the control station is configured to determine whether the node should execute another automatic activation operation, and to send a message to the node to reset the auto-activation complete flag based on said determining.

8. The system of claim 1, wherein the control station is configured to accept or reject the results based at least in part on the node identifier.

9. The system of claim 1, wherein the node is configured to store at least some of the results of the automatic activation operation in a memory, and the control station is configured to initiate an override communication sequence to the node that causes the node to modify data which was stored in the memory of the node during the automatic activation operation.

10. A lighting fixture controller, comprising:
a processor;
a first interface, coupled to the processor, and configured to communicate with a lighting fixture;
a second interface, coupled to the processor, and configured to communicate with a control station, wherein the control station recognizes the combination of the lighting fixture controller and the lighting fixture as a node; and
memory including computer-executable instruction that configure the processor to perform operations including:
determining whether to perform an automatic activation operation for the lighting fixture controller;
based on a determination that the automatic activation operation should be performed, causing the lighting fixture controller to determine at least one of:
a GPS coordinate of the node,
an operating Voltage of the node,
a lamp Wattage of the lighting fixture,
a lamp type of the lighting fixture, and
a dimming capability of the lighting fixture;
sending the results of said determining and an identifier of the node to the control station via the second interface; and
storing at least part of the results in the memory.

11. The controller of claim 10, wherein the results include an exception flag, indicating at least one of that an expected element of information was not obtained by the automatic activation operation, or that an element of information obtained by the automatic activation operation is outside of a predetermined range.

12. The controller of claim 10, wherein determining whether the automatic activation operation should be performed includes checking for an auto-activation complete flag.

13. The controller of claim 10, wherein the controller is further configured to set an auto-activation complete flag based at least in part on completion of the automatic activation operation, to receive a reset signal from the control station, and to reset the auto-activation complete flag based at least in part on the reset signal.

14. The controller of claim 10, wherein the controller is configured to enter a dimming learning mode during the automatic activation operation, and to determine the dimming capability of the lighting fixture based at least in part on the dimming learning mode.

15. The controller of claim 10, wherein the results include the identifier of the node, the GPS coordinate of the node, the operating Voltage of the node, the lamp Wattage of the lighting fixture, the lamp type of the lighting fixture, and the dimming capability of the lighting fixture.

16. A lighting fixture control system, comprising:
a processor;
a communication device; and
memory including computer-executable instruction that configure the processor to perform operations including:
receiving, via the communication device, an automatic activation message for a node including a remote lighting control module and a lighting fixture associated with the lighting control module, the automatic activation message including a node identifier;
validating the automatic activation message based at least in part on the node identifier;
storing information associated with the node based at least in part on the validation, wherein the information associated with the node includes at least one of:
a GPS coordinate of the node,
an operating Voltage of the node,
a lamp Wattage of the lighting fixture,
a lamp type of the lighting fixture, and
a dimming capability of the lighting fixture;
at least one of enabling or altering a control option in a user interface based at least in part on the information associated with the node; and
sending, via the communication device, commands to the lighting control module based on an input received via the user interface.

17. The system of claim 16, wherein the information associated with the node is received during an initial registration process of the node with a control station.

18. The system of claim 17, wherein at least some of the information associated with the node is updated based at least in part on another automatic activation message received from the node.

19. The system of claim 16, wherein the system is further configured to determine whether the node should execute an automatic activation operation, and to send a message to the node to reset an auto-activation complete flag based on said determining.

20. The system of claim 16, wherein the system is further configured to send a communication sequence to the node that overrides information included in the automatic activation message, such that data stored in the memory of the node during an automatic activation operation is modified to values provided in the communication sequence.

* * * * *